(12) United States Patent
Bl et al.

(10) Patent No.: US 7,848,292 B2
(45) Date of Patent: Dec. 7, 2010

(54) METHOD OF DYNAMICALLY POPULATING A NEIGHBOR LIST IN A WIRELESS COMMUNICATION SYSTEM

(75) Inventors: Ql Bl, Morris Plains, NJ (US); Yang Yang, Parsippany, NJ (US); Miguel Dajer, Succa Sunna, NJ (US); Sigen Ye, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 866 days.

(21) Appl. No.: 11/427,621

(22) Filed: Jun. 29, 2006

(65) Prior Publication Data

US 2008/0002628 A1  Jan. 3, 2008

(51) Int. Cl.
*H04W 4/00* (2009.01)
(52) U.S. Cl. .................. 370/331; 370/332; 455/436; 455/437; 455/438; 455/439; 455/440
(58) Field of Classification Search .................. 455/436, 455/437, 438, 439, 440, 442, 443, 423; 370/331, 370/332
See application file for complete search history.

(56) References Cited

U.S. PATENT DOCUMENTS

| 2005/0020203 A1* | 1/2005 | Losh et al. ................. 455/11.1 |
| 2005/0020267 A1 | 1/2005 | Welnick et al. ............. 455/437 |
| 2006/0252428 A1* | 11/2006 | Agashe et al. ............... 455/436 |
| 2006/0285503 A1* | 12/2006 | Mese et al. .................. 370/254 |
| 2007/0149201 A1* | 6/2007 | Dominique et al. ......... 455/442 |

FOREIGN PATENT DOCUMENTS

GB  1 633 166 A  3/2006

OTHER PUBLICATIONS

International Search Report and Written Opinion mailed Jan. 16, 2008.

* cited by examiner

*Primary Examiner*—Daniell L Negrón
*Assistant Examiner*—Huy D Nguyen
(74) *Attorney, Agent, or Firm*—Williams, Morgan & Amerson, PC

(57) ABSTRACT

The present invention provides a method of dynamically forming a neighbor list in a wireless communication system. Embodiments of the method may include forming a neighbor list associated with at least one sector based on information provided by at least one mobile unit.

18 Claims, 2 Drawing Sheets

METHOD OF DYNAMICALLY POPULATING A NEIGHBOR LIST IN A WIRELESS COMMUNICATION SYSTEM

BACKGROUND OF THE INVENTION

1. Field of the Invention

This invention relates generally to communication systems, and, more particularly, to wireless communication systems.

2. Description of the Related Art

The coverage area of a wireless communication system is typically divided into a number of geographic areas that are conventionally referred to as cells. The coverage area of each cell in the wireless network is limited by the propagation loss of radio signals transmitted by base stations that provide coverage to the cell. Thus, the coverage area of each cell is determined by the location and the transmit power of the base station, as well as the geography of the cell in the location of any interfering objects. For example, the coverage area of a cell may be reduced if a building or a mountain is present near the base station. The boundaries of the cells are not rigidly defined and may vary with time. Thus, coverage areas may overlap such that multiple base stations may provide coverage to the overlapping regions, although the strength of the signal provided within the overlapping regions may be different for the different base stations.

Mobile units located in the coverage area of a cell may access the wireless communications system by establishing a wireless communication link, often referred to as an air interface, with a base station associated with the cell. Since the cells may overlap and multiple base stations may provide wireless connectivity to each mobile unit, mobile units typically select the base station (and/or the associated cell) that provides the best connection to the wireless communication network. The selected base station may then become the serving base station for the mobile unit and the mobile unit may form a wireless communication link (or air interface) with the serving base station.

The serving base station may be selected by comparing a variety of parameters including the quality of service that may be provided over the air interface, bit error rates associated with signals transmitted over the air interface, signal strengths, interference, and the like. The connection parameters associated with each base station are typically determined using measurements of a pilot signal broadcast by each base station and received at the mobile unit. For example, the pilot signal may be transmitted on a pilot channel such as an unmodulated, direct sequence spread spectrum signal transmitted by base stations that operate according to Code Division Multiple Access (CDMA) protocols. The pilot signal may provide a phase or timing reference for coherent demodulation, a reference for signal strength or quality of service comparisons between base stations, and the like.

A list of the sectors that neighbor the current sector, conventionally referred to as a neighbor list, is broadcast to mobile units within the coverage area of the wireless communication network. The mobile unit may then use the neighbor list to select pilot signals that should be monitored to decide which base station should act as the serving base station. For example, a first base station may be providing wireless connectivity to the mobile unit in a first sector. The neighbor list for the first sector may indicate that second and third sectors are adjacent the first sector. The mobile unit may monitor pilot signals transmitted by one or more base stations associated with the first, second, and third sectors. If the mobile unit roams into one of the neighboring sectors, the monitored pilot signals may indicate which sector would provide superior connectivity to the mobile unit and the mobile unit may hand off to this sector.

The mobile unit relies upon the wireless communication system to provide a neighbor list that accurately reflects the sectors that are neighbors of the (serving) sector that currently includes the mobile unit. If the neighbor list contains incorrect information, a mobile unit may be misled into monitoring incorrect or nonexistent pilot signals. Consequently, an inaccurate neighbor list may cause access failure or call drops due to the inconsistency between the actual context of the mobile unit and the context indicated in the neighbor list.

Neighbor lists are conventionally generated and/or populated empirically using measurements performed at various locations within the coverage area of the wireless communication system. For example, test engineers may take test drives through the coverage area of the wireless communication system and use special equipment to scan the entire spectrum in the neighboring areas. These measurements may be used to identify the pilot signals that are likely to be most visible to mobile units located in different test locations within the sector/cell coverage. The identified pilots are manually populated into the system configuration, one sector-carrier a time. Each sector-carrier can be put in-service only after the whole testing process and the associated configuration are completed and verified.

Conventional techniques for generating and/or populating the neighbor list are time-intensive, costly, and prone to error. Any human mistake in performing or recording the measurements, as well as in populating the neighbor list and configuring a wireless communication system, may cause an incorrect or inaccurate neighbor list. The neighbor list may also be incorrect or inaccurate if the testing engineer bypasses or misses any areas within the coverage area. Furthermore, the neighbor lists determined using conventional techniques are static and not able to respond to time-dependent variations in pilot signal strengths or cell boundaries. These inaccuracies may degrade performance of the system and in some cases may even cause significant outages.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for dynamically forming a neighbor list in a wireless communication system. Embodiments of the method may include forming a neighbor list associated with at least one sector based on information provided by at least one mobile unit. Other embodiments of the method may include providing information provided by at least one mobile unit such that a neighbor list associated with at least one sector is formed based on the information.

BRIEF DESCRIPTION OF THE DRAWINGS

The invention may be understood by reference to the following description taken in conjunction with the accompanying drawings, in which like reference numerals identify like elements, and in which.

Figure 1:
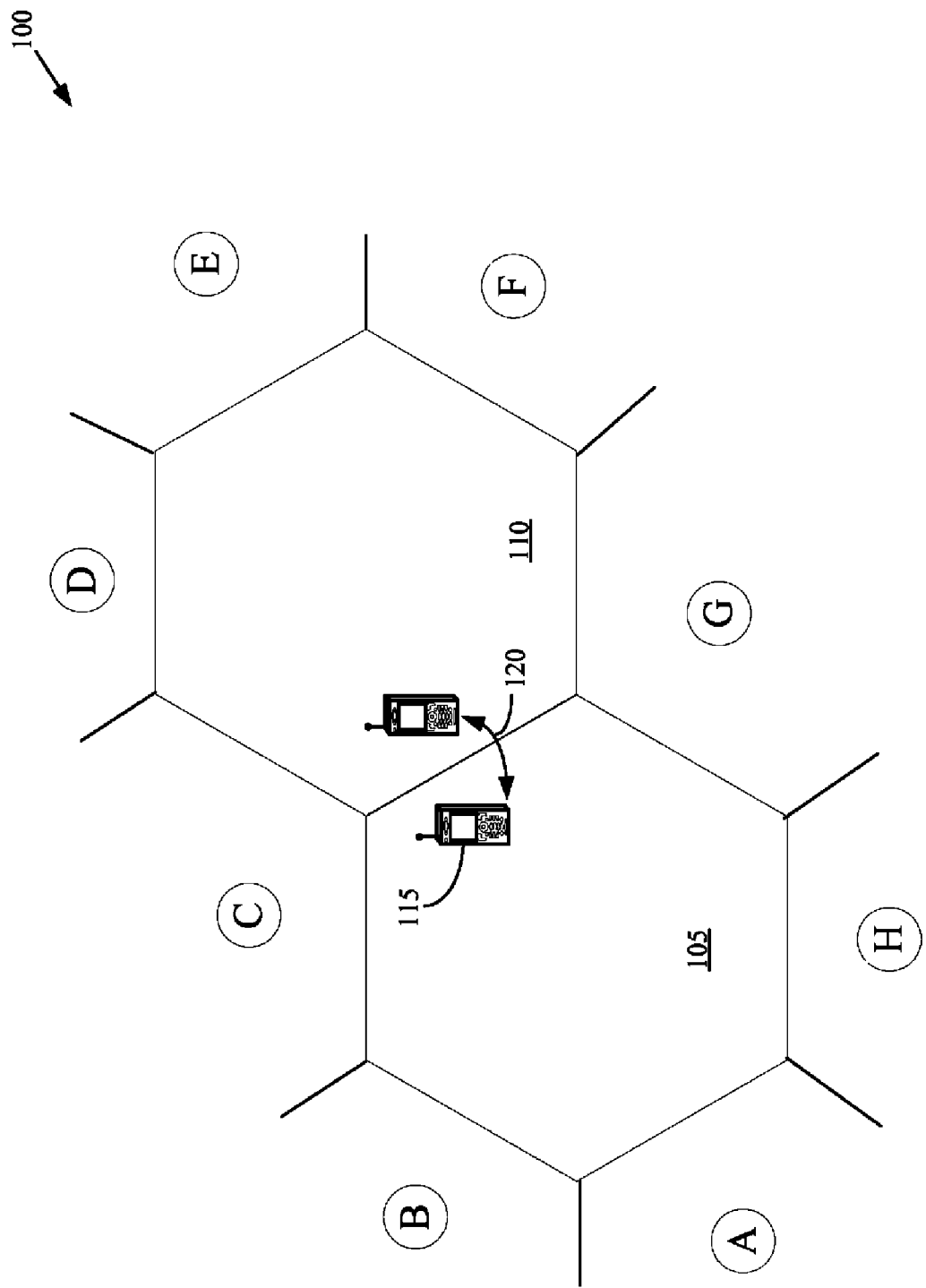
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 provides wireless connectivity to cells 105, 110, as well as the neighboring cells A-H. The cells 105, 110 (and the portions of the cells A-H) are depicted in FIG. 1 as hexagon, which approximately corresponds to the shape of a cell that receives wireless connectivity from a single omnidireactional base station or node-B (not shown). However, persons of ordinary skill in the art having benefit of the present disclosure should appreciate that the hexagonal cells 105, 110, A-H are an idealized approximation of the shape of a cell and that actual cells may have irregular, overlapping, and/or time-varying cell boundaries. Furthermore, persons of ordinary skill in the art having benefit of the present disclosure should also appreciate that the cells 105, 110, A-H may be divided into sectors that receive wireless connectivity from different antennas associated with the base stations in the cells 105, 110, A-H. The sectors are typically approximately wedge-shaped and the apex of the wedge approximately coincides with the location of the base station.

A mobile unit 115 may access the wireless communication system 100 over an air interface with one or more base stations in the cells 105, 110, A-H. Techniques for establishing, maintaining, and/or operating air interfaces are known in the art and in the interest of clarity only those aspects of wireless communication over the air interfaces that are relevant to the present invention will be discussed further herein. When the mobile unit 115 is receiving wireless connectivity via the (serving) cell 105, one or more entities within the wireless communication system 100 may provide a neighbor list to the mobile unit 115. As used herein and in accordance with usage in the art, the term "a neighbor list" will be understood to refer to information that indicates any or all of the cells that are neighbors with the current serving cell for the mobile unit 115. The neighbor cells provide wireless connectivity to a geographic area that is adjacent to or at least partially overlapping with the geographic area served by the current serving cell. For example, when the cell 105 is the serving cell for the mobile unit 115, the mobile unit 115 may receive a neighbor list that indicates that the cells 110, A-C, G-H are neighbors of the serving cell 105. In practice, the actual neighbor cells are determined by the actual radiofrequency propagation characteristics of the signals provided by the base stations. These characteristics may fluctuate in time and/or space so the neighbor list maintained by the system 100 may or may not correspond to the actual neighbors at any given time.

The mobile unit 115 may use the neighbor list for a variety of purposes. In one embodiment, the mobile unit 115 uses the neighbor list to determine whether or not to hand over to a neighboring cell. For example, when the mobile unit 115 is in the cell 105, the mobile unit 115 may monitor pilot signals provided by base stations that provide wireless connectivity to the cells 110, A-C, G-H indicated in the neighbor list. The mobile unit 115 may determine signal strengths of the pilot signals from each of the cells 110, A-C, G-H and use this information to determine whether or not to hand off from the current serving cell 105 to one of the neighboring cells 110, A-C, G-H. For example, if the signal strength of the pilot signal received from the cell 110 is comparable to or larger than the signal strength of the pilot signal received from the serving cell 105, the mobile unit 115 may initiate a handover, such as a soft handover, to the cell 110, as indicated by the arrow 120.

The mobile unit 115 may also monitor pilot signals that are not in the neighbor list associated with the serving cell 105, in accordance with one embodiment of the present invention. For example, when the mobile unit 115 is in soft handoff with the cells 105, 110, the wireless communication system 100 may form a combined neighbor list that includes neighbors of the cells 105, 110 that are involved in the soft handoff of the mobile unit 115, e.g., the cells 105, 110, A-H. The combined neighbor list may then be provided to the mobile unit 115, which may monitor pilot signals associated with the cells indicated in the combined neighbor list. Persons of ordinary skill in the art having benefit of the present disclosure should appreciate that the present invention is not limited to combined neighbor lists formed during soft handoff. In alternative embodiments, the mobile unit 115 may select additional pilot signals from measurement and/or monitoring in any manner, e.g., using historical information or other information provided by the wireless communication system 100. For example, the mobile unit 115 may maintain a local neighbor set array and/or a remaining set array that may store information indicative of pilot signals that are currently or previously monitored by the mobile unit 115.

Information collected by the mobile unit 115 by measuring or monitoring the pilot signals may then be used to determine and/or modify neighbor lists associated with one or more of the cells 105, 110, in accordance with one embodiment of the present invention. In one embodiment, signal strengths of the pilot signals provided by the cells 105, 110, A-H in the combined neighbor list may be compared to one or more thresholds for adding a cell to a neighbor list or subtracting a cell from a neighbor list him as will be discussed in detail below.

Figure 2:
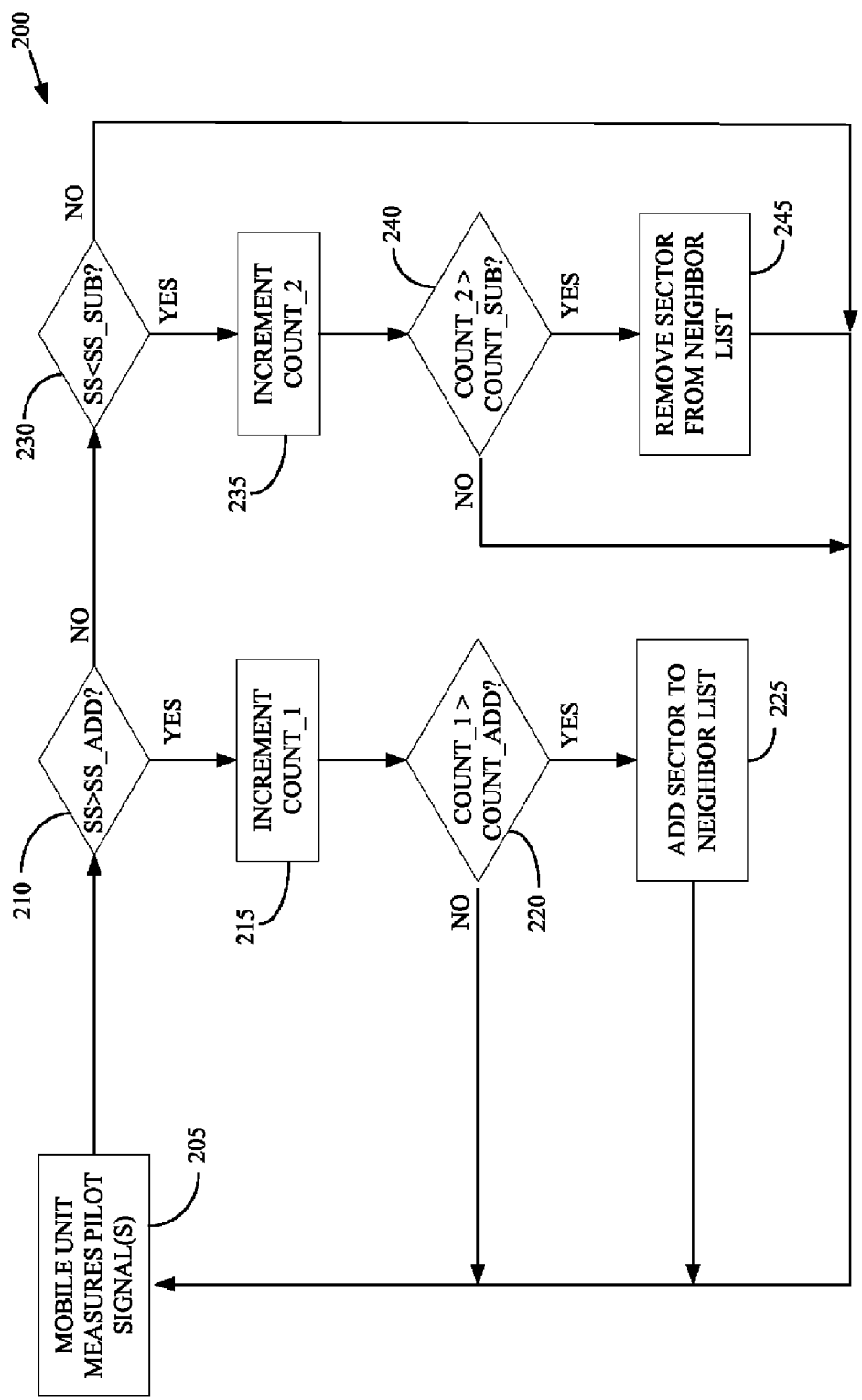
FIG. 2 conceptually illustrates one exemplary embodiment of a method of forming a neighbor list, in accordance with the present invention.

FIG. 2 conceptually illustrates one exemplary embodiment of a method 200 of forming a neighbor list. In the illustrated embodiment, the method 200 assumes that an initial neighbor list may be generated so that mobile units are able to transition between any two sectors or cells within the soft handoff universe of the wireless communication system using the information stored in the neighbor list. For example, mobile units that monitor pilot signals indicated in the initial neighbor list for the current serving sector or cell are able to perform soft handoff to other sectors indicated in the initial neighbor list. In one embodiment, the initial neighbor list may be generated using a geographical network layout map and models for propagation loss of the signals provided by base stations and/or antennas within the network. The model may be a theoretical radiofrequency model and/or an empirical radiofrequency model. Once the initial neighbor list has been generated, it may be populated into the entire system.

The mobile unit implementing portions of the method 200 is also assumed to be monitoring pilot signals associated with one or more sectors or cells that are not included in a neighbor list associated with any single cell. For example, in the illustrated embodiment, the mobile unit is assumed to be monitoring pilot signals associated with a combined neighbor list formed when the mobile unit is in soft handoff between two sectors or cells. The mobile unit may measure (at 205) one or more pilot signals associated with the cells or sectors indicated in the combined neighbor list, such as a combined neighbor list formed using the initial neighbor list(s) described above. The mobile unit may then determine a signal strength (SS) associated with each of the pilot signals indicated in the combined neighbor list.

The mobile unit may then report the signal strength of one or more of the pilot signals to an entity within the wireless communication system, which determines (at 210) whether the signal strength is above a threshold for the signal strength (SS_ADD) that indicates that the cell or sector providing the pilot signal should be considered for addition to the neighbor list of a current serving cell. If the signal strength exceeds (at 210) the signal strength threshold (SS_ADD), then a counter (COUNT_1) associated with the cell or sector may be incremented (at 215). If the value of the counter (COUNT_1) exceeds (at 220) a threshold value (COUNT_ADD), then the cell or sector may be added (at 225) to the neighbor list of the current serving cell. If the value of the counter (COUNT_1) does not exceed (at 220) the threshold value (COUNT_ADD), then the wireless communication system may wait for subsequent reports from the mobile unit. Implementing the counters and thresholds described above (COUNT_1, COUNT_ADD) may help to filter out transient fluctuations in the signal strength that may not necessarily indicate that a cell or sector should be added to the neighbor list.

If the signal strength does not exceed (at 210) the signal strength threshold (SS_ADD) for addition to the neighbor list, then the wireless communication system may determine (at 230) whether or not the signal strength falls below a threshold (SS_SUB) for removing the cell or sector from the neighbor list. If the signal strength does not fall below the threshold (SS_SUB), then the wireless communication system may wait for subsequent pilot signal strength reports from the mobile unit. If the signal strength does fall (at 210) below the threshold (SS_SUB), then the cell or sector may be a candidate for removal from the neighbor list associated with the current serving cell and so a counter (COUNTER_2) may be incremented (at 235). If the counter (COUNTER_2) does not exceed (at 240) a threshold (COUNTER_SUB) for removing the cell or sector from the neighbor list, then the wireless communication system may wait for subsequent reports from the mobile unit. If the counter (COUNTER_2) exceeds (at 240) the threshold (COUNTER_SUB), then the wireless communication system may remove (at 245) the cell or sector from the neighbor list associated with the current serving cell. Implementing the counters and thresholds described above (COUNT_2, COUNT_SUB) may help to filter out transient fluctuations in the signal strength that may not necessarily indicate that a cell or sector should be removed from the neighbor list.

Although the counters described above are incremented by integer values, the present invention is not limited to this technique. For example, the counters described above may be incremented (or decremented) by values that are proportional to (or weighted by) the signal strength of the associated pilot signal. Furthermore, in alternative embodiments, counters may not necessarily be used to filter out transient fluctuations in the signal strength.

Embodiments of the techniques described above for dynamically forming neighbor lists in a wireless communication system may provide an automatic method to generate and maintain the neighbor lists for cells or sectors in a cellular network. Generating and maintaining neighbor lists is regarded as a high-cost operating expense (OPEX) item that must be paid for by the service provider. Thus, embodiments of the techniques described above may greatly reduce the service provider's OPEX. In addition, by using network intelligence instead of human-centric driving test and population, the neighbor list generated and maintained according to embodiments of the techniques described above is much more accurate and robust than conventional pre-determined neighbor lists.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   modifying, at an entity in a wireless communication system, a neighbor list associated with at least one first sector associated with at least one antenna of a base station, the neighbor list being modified using time dependent information transmitted over an air interface to the entity by at least one mobile unit.

2. The method of claim 1, wherein modifying the neighbor list comprises modifying the neighbor list using information indicative of at least one measurement of a time dependent pilot signal performed by said at least one mobile unit.

3. The method of claim 2, wherein modifying the neighbor list comprises adding at least one second sector to the neighbor list based on said at least one measurement of a time dependent pilot signal associated with said at least one second sector by said at least one mobile unit.

4. The method of claim 3, wherein adding said at least one second sector to the neighbor list comprises adding said at least one second sector to the neighbor list if a strength determined by said at least one measurement of the time-dependent pilot signal exceeds a first threshold strength.

5. The method of claim 2, wherein forming the neighbor list comprises removing at least one second sector from the neighbor list based on said at least one measurement of a pilot signal associated with said at least one second sector by said at least one mobile unit.

6. The method of claim 5, wherein removing said at least one second sector from the neighbor list comprises removing said at least one second sector from the neighbor list if a strength of said at least one pilot signal falls below a second threshold strength.

7. The method of claim 1, wherein modifying the neighbor list comprises modifying the neighbor list based on information transmitted over the air interface to the entity by at least one mobile unit that is or has been in soft handoff between at least two sectors.

8. The method of claim 1, comprising forming an initial neighbor list based on at least one of a geographical network layout map, a theoretical model of radiofrequency propagation loss, and an empirical model of radiofrequency propagation loss, and wherein modifying the neighbor list comprises modifying the initial neighbors list in response to fluctuating radio frequency propagation characteristics of at least one pilot signal monitored by said at least one mobile unit.

9. The method of claim at 8, wherein dynamically modifying the initial neighbor list comprises modifying the initial neighbor list based on the information transmitted over the air interface to the entity in the wireless communication system by said at least one mobile unit.

10. The method of claim 9, wherein modifying the neighbor list comprises modifying the neighbor list in response to receiving the information transmitted by said at least one mobile unit.

11. A method, comprising:
    forming a neighbor list associated with at least one first sector associated with at least one antenna of a first base station, the neighbor list being formed based on information provided by at least one mobile unit by adding, at least one second sector to the neighbor list when a number of measurements of a strength of, at least one pilot signal from said at least one second sector exceeds a first threshold strength more than a predetermined number of times.

12. A method, comprising:
    forming a neighbor list associted with at least one first sector associated with at least one antenna of a first base station, the neighbor list being formed based on information provided by at least one mobile unit by removing, at least one second sector from the neighbor list if a number of measurements of a strength of, at least one pilot signal from said at least one second sector falls below a second threshold strength more than a predetermined number of times.

13. A method, comprising:
    providing time dependant information from at least one mobile unit over an air interface to an entity in a wireless communication system such that the entity can use the time dependent information to dynamically modify a previously determined neighbor list associated with at least one sector associated with at least one antenna of a first base station, wherein said at least one sector includes said at least one mobile unit.

14. The method of claim 13, wherein providing the time dependent information comprises providing information indicative of at least one measurement of a time dependent pilot signal performed by said at least one mobile unit.

15. The method of claim 14, wherein providing the time dependent information comprises providing information indicative of at least one time dependent signal strength of the time dependent pilot signal.

16. The method of claim 14, comprising performing a plurality of measurements of a plurality of time dependent pilot signals associated with said at least one sector and at least one other sector during soft handoff between said at least one sector and said at least one other sector.

17. The method of claim 16, comprising receiving a combined neighbor list associated with said at least one sector and said at least one other sector involved in the soft handoff.

18. The method of claim 17, wherein performing the plurality of measurements comprises performing a plurality of time dependent measurements on a plurality of pilot signals associated with sectors indicated in the combined neighbor list.

* * * * *